US012761426B2

(12) United States Patent
Nguyen et al.

(10) Patent No.: US 12,761,426 B2
(45) Date of Patent: Oct. 13, 2026

(54) OPTICAL DEVICE

(71) Applicant: SUMITOMO ELECTRIC INDUSTRIES, LTD., Osaka (JP)

(72) Inventors: Hong Chuyen Nguyen, Osaka (JP); Tetsuya Nakanishi, Osaka (JP); Takayuki Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 234 days.

(21) Appl. No.: 18/580,231

(22) PCT Filed: Aug. 10, 2022

(86) PCT No.: PCT/JP2022/030668
§ 371 (c)(1),
(2) Date: Jan. 18, 2024

(87) PCT Pub. No.: WO2023/037821
PCT Pub. Date: Mar. 16, 2023

(65) Prior Publication Data

US 2024/0329334 A1 Oct. 3, 2024

(30) Foreign Application Priority Data

Sep. 10, 2021 (JP) ................................ 2021-147495

(51) Int. Cl.
*H04B 10/00* (2013.01)
*G02B 6/42* (2006.01)

(52) U.S. Cl.
CPC ......... *G02B 6/4202* (2013.01); *G02B 6/4216* (2013.01)

(58) Field of Classification Search
CPC .. G02B 6/4202; G02B 6/4216; G02B 6/4292; G02B 6/42
See application file for complete search history.

(56) References Cited

U.S. PATENT DOCUMENTS 10,826,613 B1 * 11/2020 Liang ........................ B60G 3/00
11,121,776 B2 * 9/2021 Aboagye .............. G02B 6/4284
(Continued)

FOREIGN PATENT DOCUMENTS

JP 2012-530944 A 12/2012
WO 2010/148336 A1 12/2010

OTHER PUBLICATIONS

Brian Welch; "Co-Packaged Optics Integration;" Cisco; 2020.

*Primary Examiner* — Agustin Bello
(74) *Attorney, Agent, or Firm* — Oliff PLC

(57) ABSTRACT

An optical device according to one embodiment includes: a host device having an optical engine and an internal optical connector; and an optical fiber module attached to and detached from the host device. The optical fiber module includes a housing having a first surface exposed in a state of being attached to the host device and a second surface facing an opposite side of the first surface, and at least one first optical connector provided on the first surface. Furthermore, the optical fiber module includes a second optical connector provided on the second surface and capable of being optically connected to the internal optical connector; and first optical fibers optically connecting the first optical connector and the second optical connector to each other, and the number of first optical fibers being the same as the number of internal fibers.

6 Claims, 6 Drawing Sheets

(56) References Cited

U.S. PATENT DOCUMENTS

| | | | | |
|---|---|---|---|---|
| 12,066,653 | B2 * | 8/2024 | Winzer | G02B 6/4257 |
| 12,461,322 | B2 * | 11/2025 | Winzer | G02B 6/4246 |
| 2010/0027953 | A1 * | 2/2010 | Russell | G02B 6/44526 385/135 |
| 2013/0308915 | A1 | 11/2013 | Buff et al. | |
| 2014/0105612 | A1 | 4/2014 | Wu et al. | |
| 2021/0044356 | A1 * | 2/2021 | Aboagye | H04B 10/503 |
| 2023/0043794 | A1 * | 2/2023 | Winzer | G02B 6/262 |
| 2023/0176304 | A1 * | 6/2023 | Winzer | G02B 6/4284 385/92 |
| 2024/0329334 | A1 * | 10/2024 | Nguyen | G02B 6/4202 |

* cited by examiner

OPTICAL DEVICE

TECHNICAL FIELD

The present disclosure relates to optical devices.

This application claims priority based on Japanese Application No. 2021-147495 dated Sep. 10, 2021, the entire contents of which are incorporated herein by reference.

BACKGROUND ART

Non-Patent Document 1 describes a server. The server includes an optical engine mounted on an electronic circuit board, a plurality of optical fiber cables extending from the optical engine, a plurality of optical connectors, and a housing. The plurality of optical connectors are provided at the end of each optical fiber cable on the opposite side of the optical engine. The housing houses the optical engine and the optical fiber cable. The optical engine converts electrical signals into optical signals. Each of the plurality of optical fiber cables propagates the optical signal converted by the optical engine. The optical connector is attached to a panel constituting the side surface of the housing.

CITATION LIST

Non Patent Literature

Non Patent Literature 1: Brian Welch, Cisco "Co-Packaged Optics Integration" Internet <https://epic-assoc.com/wp-content/uploads/2021/06/Brian-Welch_Cisco.pdf>

SUMMARY OF INVENTION

An optical device according to the present disclosure includes: a host device having an optical engine and an internal optical connector optically connected to the optical engine via one or more internal fibers; and an optical fiber module attached to and detached from the host device. The optical fiber module includes a housing having a first surface exposed in a state of being attached to the host device and a second surface facing an opposite side of the first surface, and at least one first optical connector provided on the first surface. Furthermore, the optical fiber module includes a second optical connector provided on the second surface and capable of being optically connected to the internal optical connector; and first optical fibers optically connecting the first optical connector and the second optical connector to each other, and the number of first optical fibers being the same as the number of internal fibers.

DESCRIPTION OF EMBODIMENTS

Figure 1:
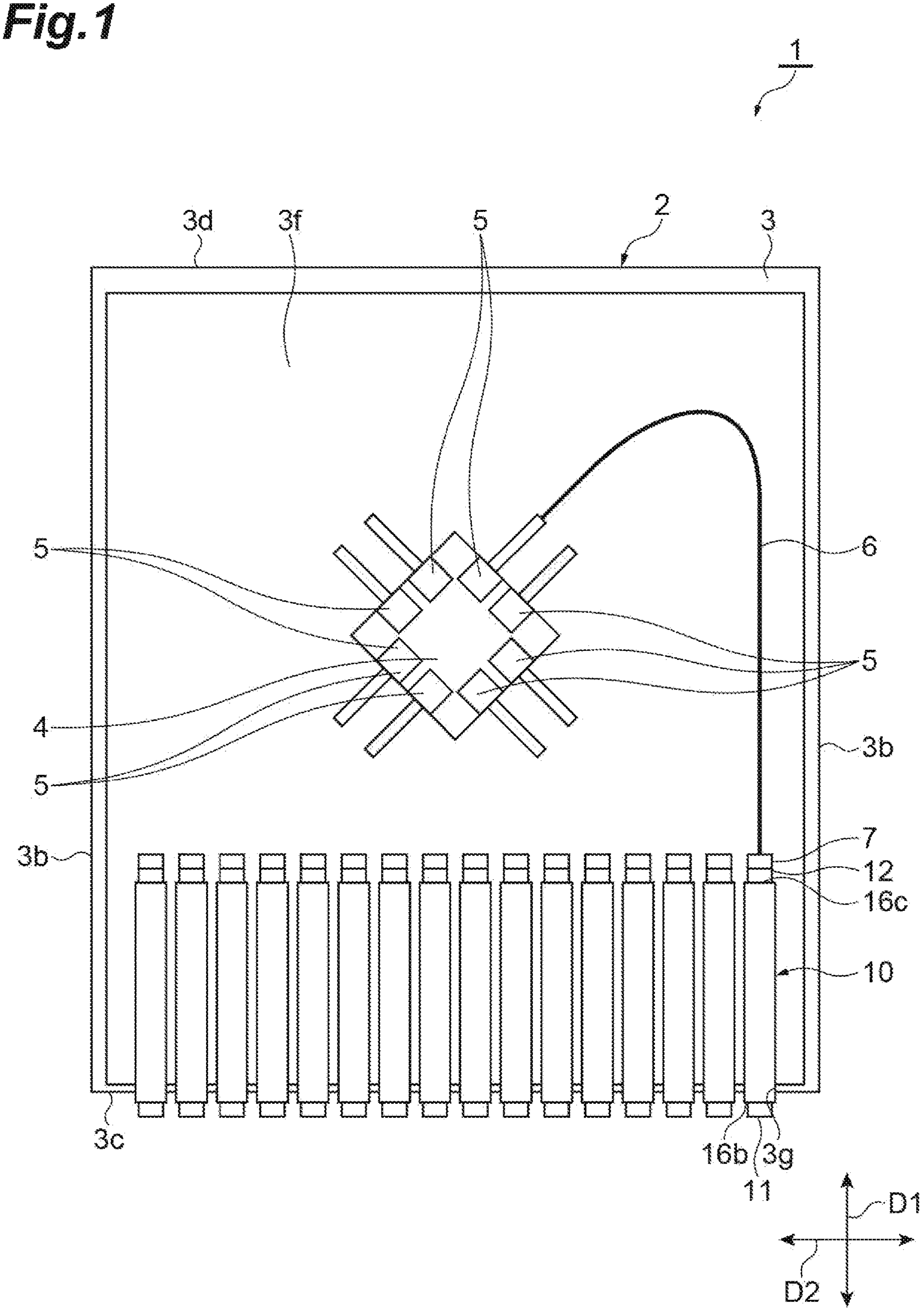
FIG. 1 is a plan view schematically illustrating an optical device according to an embodiment.

Each of the plurality of optical fiber cables extending from the optical engine is connected to each of the plurality of optical connectors. Particularly, in recent years, as the amount of data in optical communications increases, the number of optical fiber cables tends to increase. When the number of optical fiber cables is large, the configuration of the optical fiber cables inside the optical device can become complicated.

An object of the present disclosure is to provide an optical device of which configuration can be simplified.

DESCRIPTION OF EMBODIMENTS OF PRESENT INVENTION

First, contents of an embodiment of the present disclosure will be listed and described. An optical device according to the embodiment includes (1) a host device having an optical engine and an internal optical connector optically connected to the optical engine via one or more internal fibers; and an optical fiber module attached to and detached from the host device. The optical fiber module includes: a housing having a first surface exposed in a state of being attached to the host device and a second surface facing an opposite side of the first surface; and at least one first optical connector provided on the first surface. Furthermore, the optical fiber module includes: a second optical connector provided on the second surface and capable of being optically connected to the internal optical connector; and first optical fibers optically connecting the first optical connector and the second optical connector to each other, and the number of first optical fibers being the same as the number of internal fibers. Herein, the optical engine is a semiconductor device that has a function of transmitting and receiving optical signals and a function of converting optical signals and electrical signals.

This optical device includes a host device and an optical fiber module. The host device includes an optical engine and an internal optical connector optically connected to the optical engine via one or more internal fibers. The optical fiber module includes a first optical connector provided on an exposed first surface, a second optical connector provided on a second surface facing an opposite side of the first surface, and a first optical fiber optically connecting the first optical connector and the second optical connector to each other. The second optical connector is optically connected to the internal optical connector when the optical fiber module is attached to the host device. By attaching the optical fiber module to the host device, the first optical connector and the second optical connector of the optical fiber module can be optically connected to the internal optical connector. The number of first optical fibers is the same as the number of internal fibers. Therefore, the configuration of the internal fiber inside the host device and the configuration of the first optical fiber of the optical fiber module can be simplified.

(2) In (1) above, the optical device may include a light source module. The optical device may include at least one supply optical fibers optically connecting the optical engine and the light source module to each other and supplying light from the light source module to the optical engine. In this case, since the light source module supplies light to the optical engine via the supply optical fiber, the light emitting function of the optical engine itself can be made unnecessary.

(3) In (2) above, at least one supply optical fiber may include a polarization maintaining fiber. In this case, since the light of which polarization state is maintained can be input to the optical engine, the loss of light to the optical engine can be reduced.

(4) In any one of (1) to (3) above, the optical fiber module may have an optical multiplexer/demultiplexer multiplexing and demultiplexing the light passing through the first optical fiber. In this case, the light can be multiplexed and demultiplexed in the optical fiber module.

(5) In any one of (1) to (4) above, the optical fiber module may include the plurality of first optical connectors.

DETAILS OF EMBODIMENTS OF PRESENT DISCLOSURE

A specific example of the optical device according to the embodiment will be described below with reference to the drawings. The present invention is not limited to the following examples, but is indicated in the claims, and is intended to include all changes within the scope equivalent to the claims. In the description of the drawings, the same or corresponding elements are denoted by the same reference numerals, and redundant description will be omitted as appropriate. For ease of understanding, some portions of the drawings may be simplified or exaggerated, and the dimensional ratios and the like are not limited to those illustrated in the drawings.

FIG. 1 is a plan view schematically illustrating an optical device 1 including an optical fiber module 10 and a host device 2 as an example. As illustrated in FIG. 1, the host device 2 includes a housing 3, a semiconductor package 4, and an optical engine 5. The housing 3 has, for example, a rectangular shape. The housing 3 has a pair of side surfaces 3*b*, a front surface 3*c*, a rear surface 3*d*, and a bottom surface 3*f*. The pair of side surfaces 3*b* extend in a first direction D1 and are aligned along a second direction D2 intersecting the first direction D1. The optical fiber module 10 is attached to the front surface 3*c*. The rear surface 3*d* faces the opposite side of the front surface 3*c*. The bottom surface 3*f* extends in both the first direction D1 and the second direction D2. For example, the first direction D1 is a longitudinal direction of the housing 3, and the second direction D2 is a width direction of the housing 3.

Figure 2:
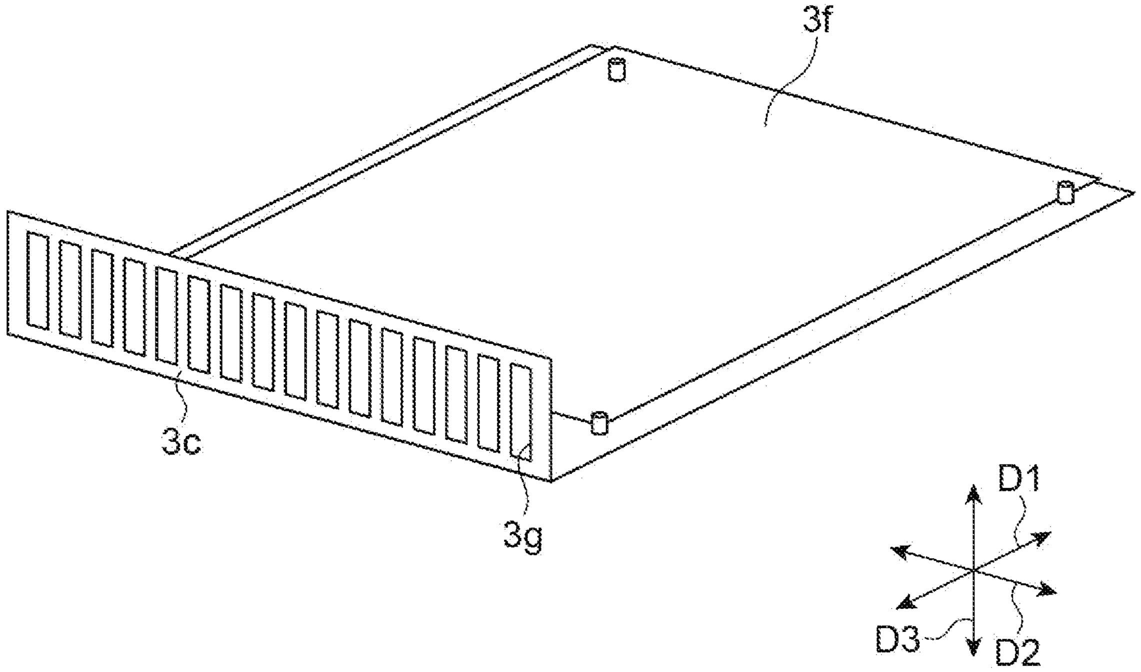
FIG. 2 is a perspective view schematically illustrating a host device of the optical device according to the embodiment.
Figure 3:
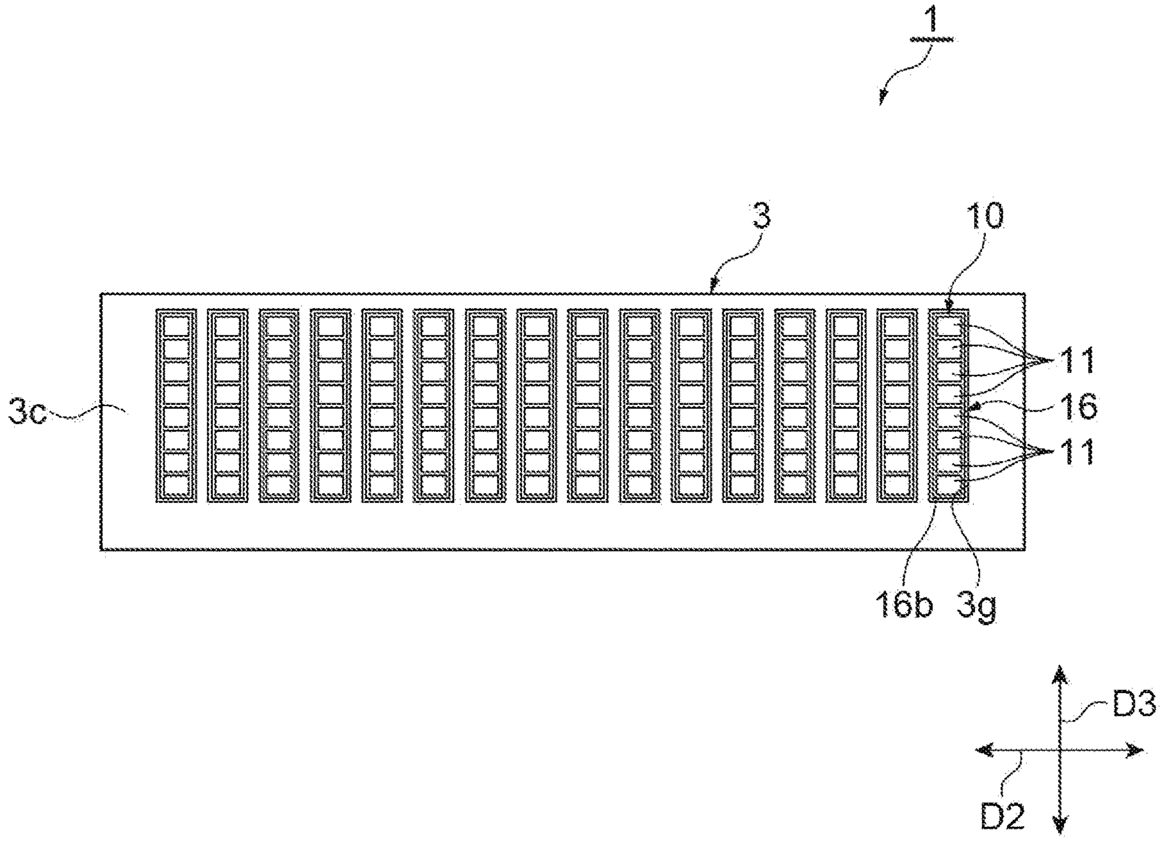
FIG. 3 is a side view illustrating the optical device according to the embodiment.

FIG. 2 is a perspective view illustrating the front surface 3*c* and the bottom surface 3*f*. FIG. 3 is a front view of the optical device 1 illustrating the front surface 3*c* of the housing 3. As illustrated in FIGS. 1, 2, and 3, each of the front surface 3*c* and the rear surface 3*d* extends in both the second direction D2 and a third direction D3. The third direction D3 is a direction intersecting both the first direction D1 and the second direction D2. For example, the first direction D1, the second direction D2, and the third direction D3 are orthogonal to each other.

The front surface 3*c* has a hole 3*g* into which the optical fiber module 10 is attached. The hole 3*g* has, for example, a rectangular shape with a long side extending in the third direction D3. The housing 3 has a plurality of the holes 3*g*, and the plurality of holes 3*g* are aligned along the second direction D2. The number of holes 3*g* and the number of optical fiber modules 10 is, as an example, 16. However, the number of holes 3*g* and the number of optical fiber modules 10 are not particularly limited.

For example, an electronic circuit is provided on the bottom surface 3*f*, and the semiconductor package 4 is mounted on the electronic circuit. The semiconductor package 4 has a plurality of the optical engines 5. The optical engine 5 photoelectrically converts an optical signal into an electrical signal. The semiconductor package 4 performs signal processing on the electrical signal converted by the optical engine 5. The host device 2 includes a plurality of the optical engines 5. Each of the plurality of optical engines 5 is optically connected to the optical fiber module 10. For example, the number of optical engines 5 is the same as the number of optical fiber modules 10.

The host device 2 includes an internal fiber 6 extending from the optical engine 5 and an internal optical connector 7 located at the end of the internal fiber 6 on the opposite side of the optical engine 5. The host device 2 includes a plurality of the optical engines 5 and a plurality of the internal fibers 6. Each of the plurality of internal fibers 6 is connected to each of the plurality of optical fiber modules 10. In FIG. 1, one internal fiber 6 is illustrated for simplicity. The internal fiber 6 is, for example, a single-core fiber. However, the internal fiber 6 may be a multi-core fiber, and the type of the internal fiber 6 is not particularly limited.

For example, the optical engine 5 has a light emitting function. The optical signal output by the optical engine 5 is converted into an electrical signal and processed by the semiconductor package 4. The electrical signal signal-processed by the semiconductor package 4 is converted into a data signal, which is an optical signal, by the optical engine 5. This data signal is output from the optical engine 5 to the optical fiber module 10 via the internal fiber 6 and internal optical connector 7.

Figure 4:
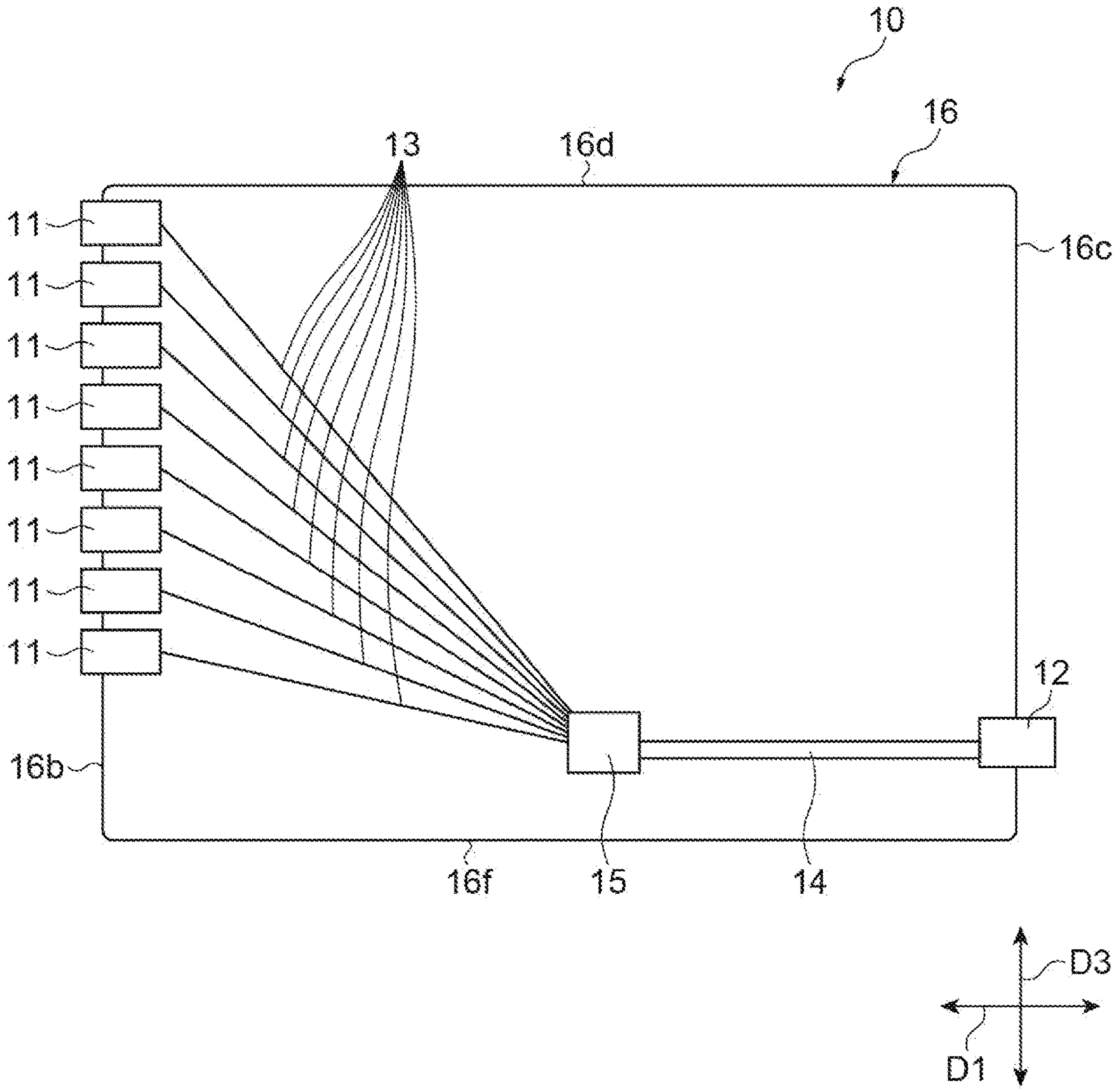
FIG. 4 is a diagram schematically illustrating an internal structure of an optical fiber module according to the embodiment.

For example, the plurality of optical fiber modules 10 are arranged so as to be aligned along the second direction D2. As an example, 16 optical fiber modules 10 are arranged so as to be aligned along the second direction D2. FIG. 4 is a diagram schematically illustrating the internal structure of the optical fiber module 10. As illustrated in FIG. 4, the optical fiber module 10 includes a plurality of first optical connectors 11, a second optical connector 12, a plurality of first optical fibers 14, and a housing 16.

The housing 16 has, for example, a rectangular parallelepiped shape. The housing 16 has a first surface 16*b* and a second surface 16*c* facing the first surface 16*b*. For example, the housing 16 has a first surface 16*b*, a second surface 16*c*, a third surface 16*d*, and a fourth surface 16*f*. The first surface 16*b* is a surface exposed to the outside of the optical device 1 when the optical fiber module 10 is attached to the host device 2. The second surface 16*c* is a surface that enters the inside of the housing 3 when the optical fiber module 10 is attached to the host device 2. The first surface 16*b* and the second surface 16*c* extend in both the second direction D2 and the third direction D3.

For example, the plurality of first optical connectors 11 are arranged so as to be aligned on the first surface 16*b*. An external connector is connected to each of the plurality of first optical connectors 11. The external connector transmits and receives data signals to and from the optical engine 5 via, for example, the first optical connector 11, the first optical fiber 14, the second optical connector 12, the internal optical connector 7, and the internal fiber 6. As an example, the number of first optical connectors 11 is 8. In this case, for example, each of the 16 optical fiber modules 10 includes 8 first optical connectors 11. Therefore, a maximum of 128 external connectors can be connected to the host device 2. The number of second optical connectors 12 is less than or equal to the number of first optical connectors 11.

Each of the plurality of first optical fibers 14 optically connects each of the plurality of first optical connectors 11 and the second optical connector 12 to each other inside the housing 16. The plurality of first optical fibers 14 are bundled. The bundled first optical fibers 14 are directly connected to the second optical connector 12. When the optical fiber module 10 is attached to the host device 2, the second optical connector 12 is optically connected to the internal optical connector 7. The number of first optical fibers 14 is the same as the number of internal fibers 6.

The optical fiber module 10 further includes an optical multiplexer/demultiplexer 15 and a plurality of second optical fibers 13. The optical multiplexer/demultiplexer 15 is provided between the first optical fiber 14 and the second optical fiber 13. The optical multiplexer/demultiplexer 15 may be provided integrally with the first optical connector 11. In this case, the second optical fiber 13 can be omitted. The optical multiplexer/demultiplexer 15 separates the wavelength multiplexed optical signal received from the first optical connector 11 and outputs the separated optical signal to the second optical connector 12 via the first optical fiber 14. The optical multiplexer/demultiplexer 15, for example, multiplexes the plurality of optical signals received from the second optical connector 12 via the first optical fiber 14, and outputs the multiplexed optical signal to the first optical connector 11.

As described above, in the optical device 1, when the optical fiber module 10 is attached to the host device 2, the second optical connector 12 is optically connected to the internal optical connector 7. By attaching the optical fiber module 10 to the host device 2, the first optical connector 11 and the second optical connector 12 of the optical fiber module 10 can be optically connected to the internal optical connector 7.

In the optical device 1, the number of first optical fibers 14 is the same as the number of internal fibers 6. Therefore, the configuration of the internal fiber 6 inside the host device 2 and the configuration of the first optical fiber 14 of the optical fiber module 10 can be simplified, and wiring can be easily performed. Furthermore, the optical fiber module 10 incorporates the optical multiplexer/demultiplexer 15. By providing the optical fiber module 10 with the optical multiplexer/demultiplexer 15, the arrangement of the optical multiplexer/demultiplexer in the host device 2 can be made unnecessary. Therefore, the configuration of the host device 2 can be simplified. It is noted that, the optical fiber module 10 may not include the optical multiplexer/demultiplexer 15 and the second optical fiber 13. In this case, the first optical fiber 14 is directly connected to the first optical connector 11.

Figure 5:
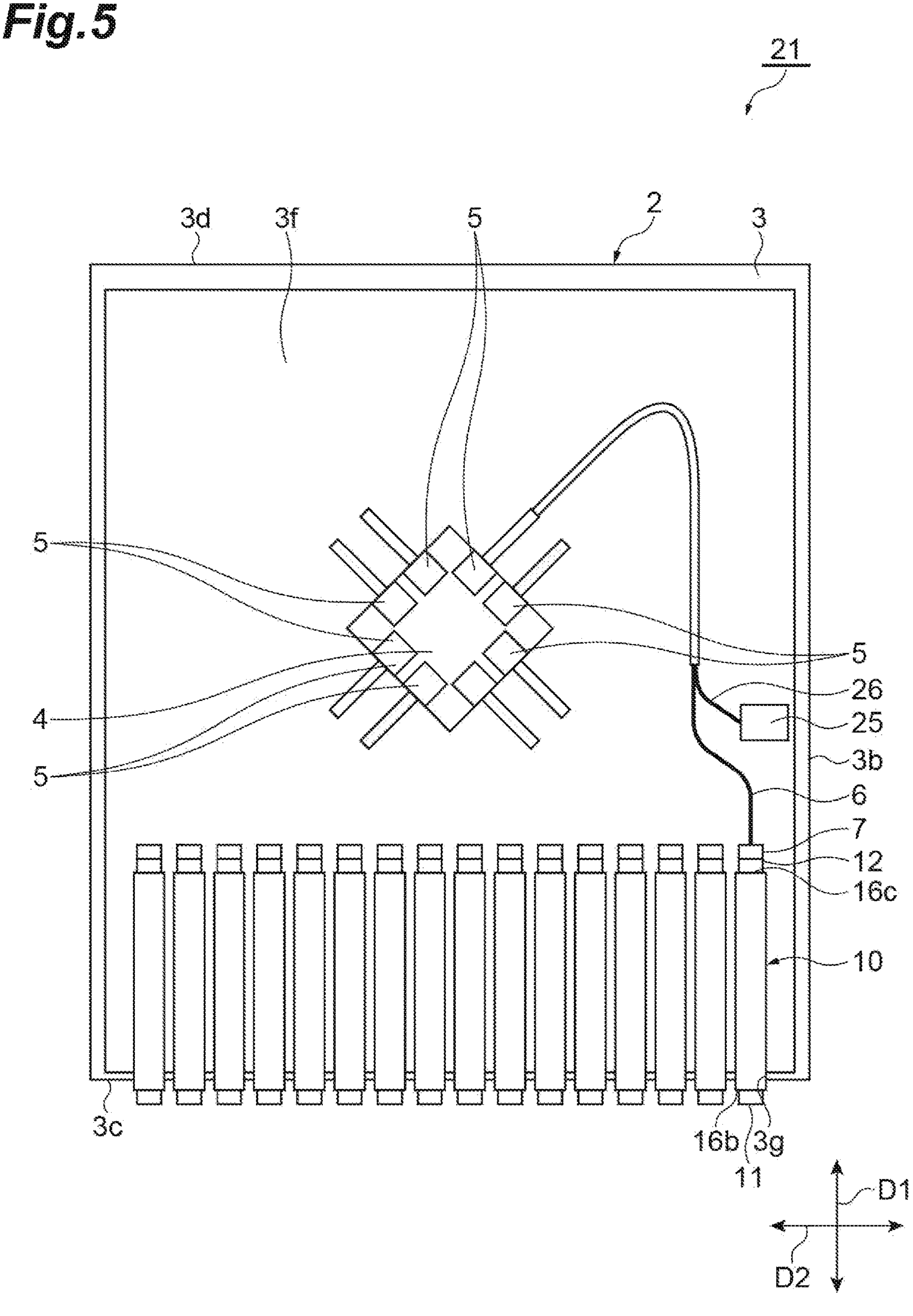
FIG. 5 is a plan view schematically illustrating an optical device according to Modified Example 1.

Next, Modified Example 1 of the optical device according to the present disclosure will be described with reference to FIG. 5. FIG. 5 is a diagram schematically illustrating the internal structure of the optical device 21 according to Modified Example 1. Since a portion of the configuration of the optical device 21 overlaps with a portion of the configuration of the optical device 1 described above, the description that overlaps with that of the optical device 1 will be denoted by the same reference numerals and omitted as appropriate below.

The optical device 21 includes a light source module 25 and a supply optical fiber 26 supplying light from the light source module 25 to the optical engine 5. The number of supply optical fibers 26 may be one or a plurality of supply optical fibers. For example, at least one of the supply optical fibers 26 is a polarization maintaining fiber (PMF). In this case, since the light of which polarization state is maintained is input to the optical engine 5, the loss of light to the optical engine 5 can be reduced. Furthermore, the light output by the light source module 25 may be a continuous wave laser (CW) light.

The light source module 25 and the supply optical fiber 26 are arranged outside the optical fiber module 10 and inside the housing 3. The light source module 25 is mounted on, for example, the bottom surface **3*f* of the housing 3. The supply optical fiber 26 optically connects the optical engine 5 and the light source module 25 to each other. The supply optical fiber 26 is, for example, bundled together with the internal fiber 6**.

For example, from the supply optical fiber 26 and the plurality of internal fibers 6 extending from the optical engine 5, the supply optical fiber 26 branches from the plurality of internal fibers 6. A light source module 25 is connected to the end of the supply optical fiber 26 on the opposite side of the optical engine 5. The light source module 25 supplies light to the optical engine 5 via the supply optical fiber 26. Therefore, the light emitting function of the optical engine 5 itself can be made unnecessary.

Figure 6:
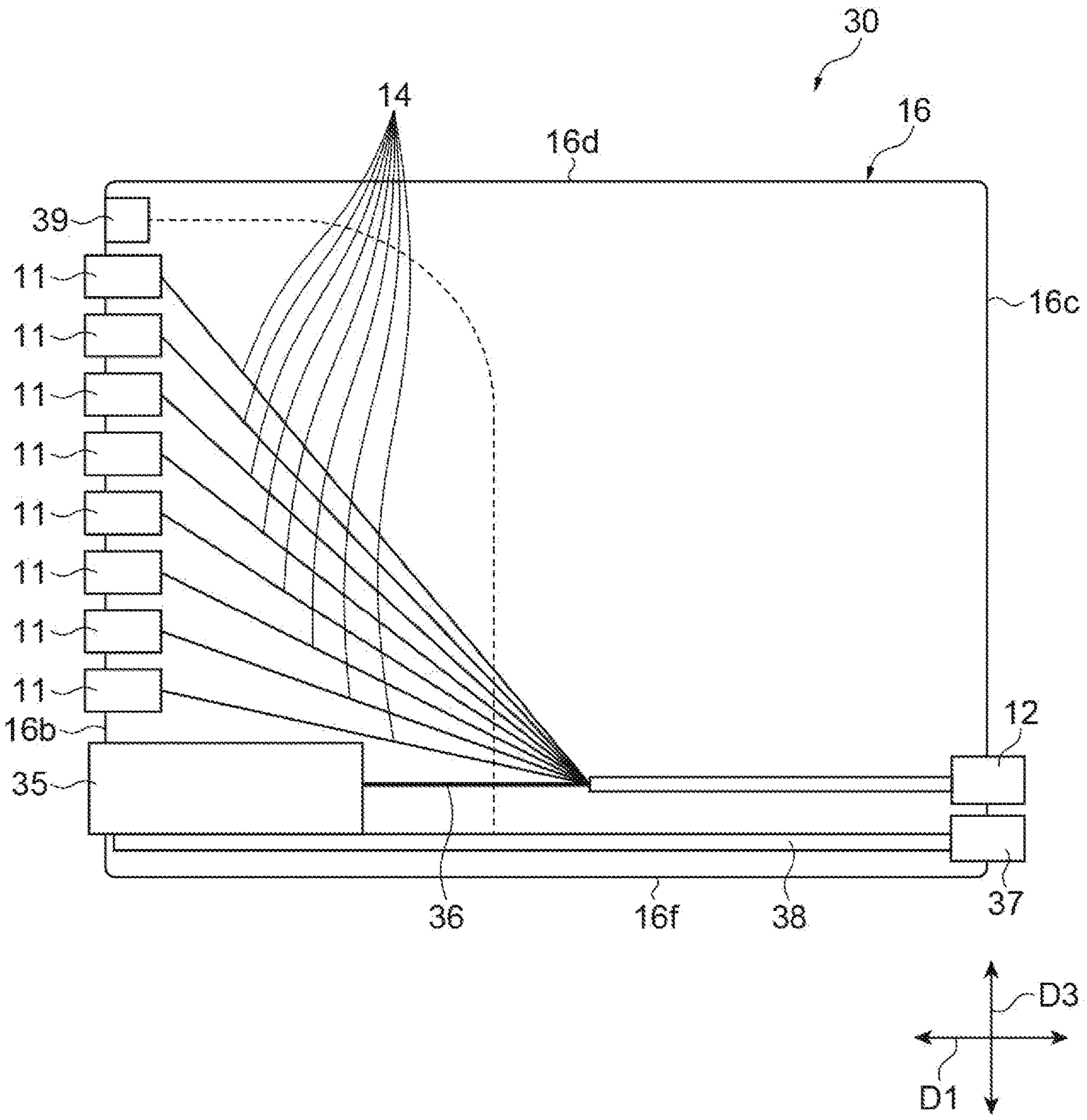
FIG. 6 is a diagram schematically illustrating an internal structure of an optical fiber module according to Modified Example 2.

Modified Example 2 will be described with reference to FIG. 6. Modified Example 2 differs from Modified Example 1 in that a light source module 35 is arranged in the optical fiber module 30. For example, the optical fiber module 30 includes a light source module 35, a supply optical fiber 36, an electrical connector 37, an electrical board 38, and an indicator lamp 39. The indicator lamp 39 receives power supply from the host device 2. The indicator lamp 39 displays the operating state of the equipment (for example, the semiconductor package 4 or the optical engine 5) inside the host device 2.

The light source module 35 supplies light to the optical engine 5 via the second optical connector 12. The light source module 35 protrudes to the outside of the housing 16 from the first surface **16*b*. As an example, the indicator lamp 39, the plurality of first optical connectors 11, and the light source module 35 are aligned in this order along the third direction D3. The light source module 35 may be, for example, an optical transceiver detachable from the housing 16. In this case, the light source module 35 can be inserted and removed from the housing 16 along the first direction D1. However, the light source module 35 may not be an optical transceiver. In this case, the light source module 35 may not protrude to the outside of the housing 16 from the first surface 16*b***.

The supply optical fiber 36 extends from the light source module 35 into the interior of the housing 16. For example, the plurality of first optical fibers 14 and the plurality of supply optical fibers 36 are bundled inside the housing 16. The bundled first optical fiber 14 and supply optical fiber 36 are connected to the second optical connector 12. The light source module 35 and the second optical connector 12 are optically connected via the supply optical fiber 36.

The electrical connector 37 is electrically connected to the host device 2. The electrical board 38 extends from the electrical connector 37 along the first direction D1. The second optical connector 12 and the electrical connector 37 are arranged so as to be aligned along the third direction D3. The second optical connector 12 and the electrical connector 37, for example, protrude to the outside of the housing 16 from the second surface **16*c*. When the optical fiber module 30 is attached to the host device 2, the electrical board 38 is electrically connected to an internal electrical connector (not illustrated) of the host device 2**.

The electrical board 38 receives power supply from the host device 2 via the electrical connector 37. For example, the light source module 35 is mounted on the electrical board 38. The light source module 35 receives power supply from the electrical board 38 and outputs light. The light output from the light source module 35 is supplied to the optical engine 5 via, for example, the supply optical fiber 36, the second optical connector 12, the internal optical connector 7, and the internal fibers 6.

For example, in Modified Example 2, the supply optical fiber 36 is not branched, and the supply optical fiber 36 optically connects the second optical connector 12 and the light source module 35 to each other. The supply optical fiber 36 may be bundled together with the first optical fiber 14 or may extend separately from the first optical fiber 14. As described above, in Modified Example 2, the light source module 35 mounted on the optical fiber module 30 supplies light to the optical engine 5. Since there is no need to mount a light source module inside the host device 2, the configuration of the host device 2 can be simplified.

Heretofore, the embodiments and various modified examples of the optical device according to the present disclosure have been described. However, the optical device according to the present disclosure is not limited to the embodiments or various modified examples described above, and can be modified as appropriate within the scope of the spirit described in the claims. For example, in the embodiment described above, the example in which 16 optical fiber modules 10 are arranged and the example in which 8 first optical connectors 11 are arranged have been described. However, the number of optical fiber modules and the number of first optical connectors are not particularly limited. The number of first optical connectors may be singular or plural. In the embodiment described above, the plurality of first optical connectors 11 aligned along the third direction D3 have been described. However, for example, the first optical connectors may be aligned in each of the second direction D2 and the third direction D3, and there is no particular limitation on the manner in which the first optical connectors are arranged.

In the above-described Modified Example 2, the example in which the optical fiber module 30 includes the electrical connector 37 and the electrical board 38 has been described. However, the optical fiber module 30 may not include at least one of the electrical connector 37 and the electrical board 38. For example, instead of the electrical connector 37, a portion of the electrical board 38 may protrude from the second surface 16*c*, and the portion of the electrical board 38 protruding from the second surface 16*c* may function as an electrical plug. The light source module 35 may be directly connected to the electrical connector 37. The electrical board of the light source module 35 may be directly and electrically connected to the internal electrical connector of the host device 2. Furthermore, the light source module 35 may be optically connected directly to the second optical connector 12 without through the supply optical fiber 36. In this case, the supply optical fiber 36 can be made unnecessary.

In the above-described Modified Example 1, the example in which the light source module 25 is arranged outside the optical fiber module 10 and inside the housing 3 has been described. In the above-described Modified Example 2, the example in which the light source module 35 is mounted on the optical fiber module 30 has been described. However, the position of the light source module can be further changed, for example, the light source module may be disposed outside the housing 3. That is, the optical device may be an optical device including a supply optical fiber extending from the optical engine 5 to the outside of the host device 2 and a light source module disposed outside the host device 2. In this case as well, the same functions and effects as in Modified Example 1 and Modified Example 2 described above can be obtained.

In the embodiment described above, the example in which one second optical connector 12 is mounted on the optical fiber module 10 has been described. However, the plurality of second optical connectors 12 are mounted on the optical fiber module 10, a portion of the plurality of first optical fibers 14 is connected to one second optical connector 12, and the remaining portion of the plurality of first optical fibers 14 may be connected to one second optical connector 12 different from the second optical connector 12 described above. In this case, the plurality of second optical connectors 12 of the optical fiber module 10 can be connected to the plurality of internal optical connectors 7.

REFERENCE SIGNS LIST

1: optical device, 2: host device, 3: housing, 3*b*: side surface, 3*c*: front surface, 3*d*: rear surface, 3*f*: bottom surface, 3*g*: hole, 4: semiconductor package, 5: optical engine, 6: internal fiber, 7: internal optical connector, 10: optical fiber module, 11: first optical connector, 12: second optical connector, 13: second optical fiber, 14: first optical fiber, 15: optical multiplexer/demultiplexer, 16: housing, 16*b*: first surface, 16*c*: second surface, 16*d*: third surface, 16*f*: fourth surface, 21: optical device, 25: light source module, 26: supply optical fiber, 30: optical fiber module, 35: light source module, 36: supply optical fiber, 37: electrical connector, 38: electrical board, 39: indicator lamp, D1: first direction, D2: second direction, D3: third direction.

The invention claimed is:

1. An optical device comprising:

a host device having an optical engine that is fixed inside the host device and an internal optical connector that is fixed inside the host device and is optically connected to the optical engine via one or more internal fibers; and an optical fiber module that is separate and distinct from the host device and is attached to and detached from the host device, wherein the optical fiber module includes:

a housing having a first surface exposed in a state of being attached to the host device and a second surface facing an opposite side of the first surface;

at least one first optical connector provided on the first surface;

a second optical connector provided on the second surface and capable of being optically connected to the internal optical connector; and first optical fibers optically connecting the first optical connector and the second optical connector to each other, the optical fiber module is attached to the host device when the second optical connector inside the optical fiber module is directly connected to the internal optical connector inside the host device, and the number of first optical fibers connected to the second optical connector inside the optical fiber module is the same as the number of internal fibers connected to the internal optical connector inside the host device.

2. The optical device according to claim 1, wherein the optical device includes a light source module, and wherein the optical device includes at least one supply optical fiber optically connecting the optical engine and the light source module to each other and supplying light from the light source module to the optical engine.

3. The optical device according to claim 2, wherein the at least one supply optical fiber includes a polarization maintaining fiber.

4. The optical device according to claim 1, wherein the optical fiber module includes an optical multiplexer/demultiplexer multiplexing and demultiplexing light passing through the first optical fiber.

5. The optical device according to claim 1, wherein the optical fiber module includes a plurality of the first optical connectors.

6. The optical device according to claim 1, wherein the optical fiber module includes a plurality of the second optical connectors.

* * * * *